(No Model.) 2 Sheets—Sheet 1.
C. R. JENNE.
ENLARGING CAMERA.
No. 463,630. Patented Nov. 24, 1891.
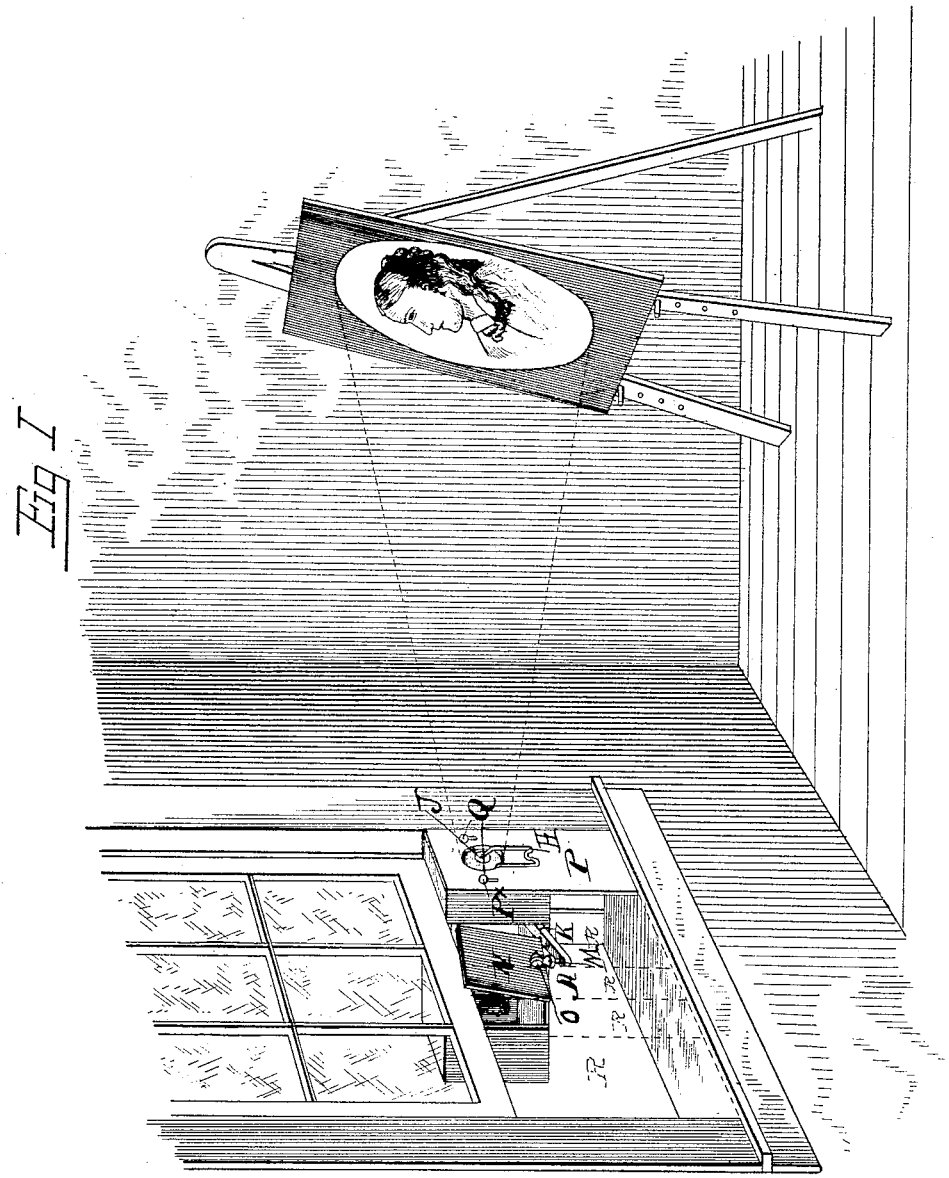
Witnesses
J. B. McGirr.
G. M. Copenhaver
Chancy R. Jenne,
INVENTOR
by Wm. N. Moore,
Attorney.

(No Model.) 2 Sheets—Sheet 2.
C. R. JENNE.
ENLARGING CAMERA.
No. 463,630. Patented Nov. 24, 1891.
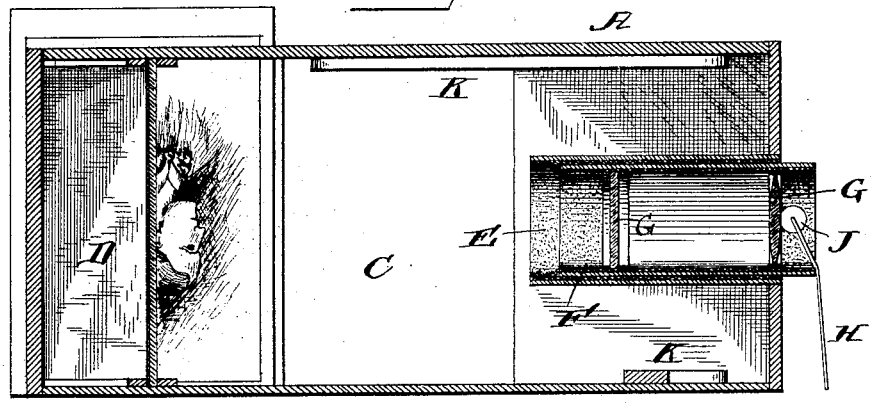
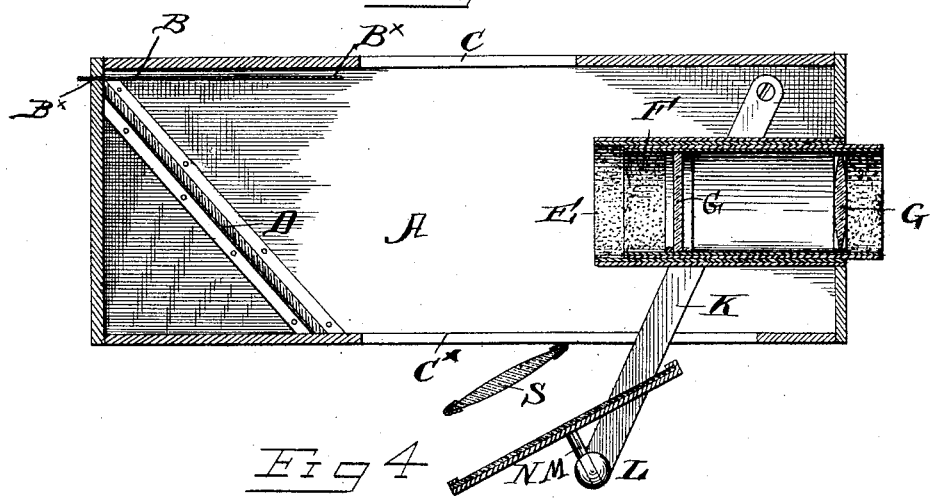
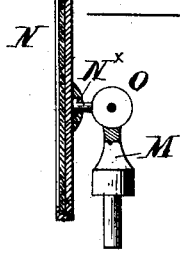

UNITED STATES PATENT OFFICE.

CHANCY R. JENNE, OF FORT WAYNE, INDIANA.

ENLARGING-CAMERA.

SPECIFICATION forming part of Letters Patent No. 463,630, dated November 24, 1891.

Application filed February 24, 1891. Serial No. 382,561. (No model.)

*To all whom it may concern:*

Be it known that I, CHANCY R. JENNE, a citizen of the United States of America, residing at Fort Wayne, in the county of Allen and State of Indiana, have invented certain new and useful Improvements in Cameras, of which the following is a specification, reference being had therein to the accompanying drawings.

My invention relates to improvements in cameras of that character employed in enlarging pictures from a photograph or any opaque object.

The leading object of my invention is the provision of a camera of the character mentioned which can be used with the light from the sun or with an artificial light, thereby enabling the camera to be employed either by day or night, and which will enlarge the picture as much as desired, and show every line or feature of the picture, thus making the task of the painter or artist easy.

A further object of my invention is the provision of a camera which shall, in addition to possessing the meritorious features named, be of simple construction, compact, and attractive, and inexpensive of production, thus possessing all the features of merit to recommend it as thoroughly efficient and practical for the intended purpose.

To attain the desired objects the invention consists in a certain novel construction, combination, and arrangement of parts, substantially as herein illustrated, described, and particularly pointed out in the claims.

In the drawings, Figure 1 represents a perspective view of a camera constructed in accordance with and embodying my invention, the camera being shown in operative position to enable persons to understand the manner of using the same. Fig. 2 represents a vertical sectional view of the camera. Fig. 3 represents a horizontal sectional view thereof. Fig. 4 represents a detail view. Fig. 5 represents a detail view of the mirror for receiving the light and reflecting it upon the photograph within the casing.

Referring by letter to the drawings, A designates the frame or casing of my improved camera, which is of rectangular shape and of proper size, and is provided with an opening C in one side to allow the insertion of a picture, and also with a slot $B^x$ to allow the insertion of the picture and to admit the rays of the sun or other light and allow them to fall upon the inclined mirror in the end of the casing, as desired, and on the other side is provided with a large opening $C^x$ to admit the light from the reflecting-mirror, as will appear.

In one end of the casing is placed a mirror D, which is inclined at an angle of about forty-five degrees, and in the other end of the casing is a circular opening, in which is placed a tube E, in which is located the tube F, having in each end a lens G, the tube and lenses forming what are termed the "enlarging-lenses." The enlarging-lenses are adjustable in the tube E, and the proper focus or adjustment of the lenses is easily secured by means of a yoke or bail H, having the ends thereof engaging buttons J, secured to the adjustable tube F, having the lenses, and by means of this yoke or bail it is evident that the tube may be drawn in or out to any desired distance, as circumstances require.

Within the casing, on the upper and lower side thereof, I pivot the inner ends of rods or bars K, which have an opening L in the outer end thereof to receive the reduced end of the standard or support M of the mirror N. The mirror N is for reflecting the light from the sun and throwing it upon the picture within the casing, and at the back is provided with an opening $N^x$, in which is received the shank of the disk O, which is pivoted in the bifurcated end of the standard or support M. By means of the swing-bars and the adjustable mirror the camera can be placed to suit the light, and the mirror can be adjusted to any desired position to throw the light upon the photograph within the casing.

In applying the camera for use I employ a supporting plate or board P, which has an opening to receive the enlarging-tube and slots $P^x$ to engage studs or projections Q on the casing, and thus the board supports the camera, and, in addition, I may use the boards R to shut out the light, all as clearly seen in Fig. 1.

The operation of my camera will be clearly understood, and, briefly stated, is as follows: The camera is adjusted to the proper position, and the mirror, which receives the light, is also adjusted properly, and the photograph is placed in the casing in the slot parallel with the enlarging-tube and at the proper angle to the mirror in the casing to cause the photograph to be reflected from said mirror through the enlarging-tube onto the canvas or other surface on which the photograph is enlarged, and to be drawn or traced, as will be readily understood.

It sometimes happens that the photograph or opaque object is obscure in some features, and in order to bring out the features clearly on the enlargement I employ the condensing-lens S, which is supported on the bar retained on the casing, and is supported between the reflecting-mirror and the photograph, and which makes clear any obscurities in the photograph.

From the drawings and the foregoing description it is evident that I produce a camera by means of which either sun or artificial light may be employed and the best results obtained. It will also be understood that the adjustable tube, carrying the lenses, can be fixed to enlarge the picture to any desired size and the adjustable mirror can be arranged to suit circumstances and concentrate the light in the most advantageous manner, and also that the camera can be changed to different windows, as found necessary. It will also be seen that my camera is compact, simple of construction, easily applied, inexpensive of production, and thoroughly efficient for the desired purpose. When the artificial light is employed, the light is reflected upon the picture within the casing and the object thus attained.

Having thus described my invention, what I claim is—

1. In a camera, the combination of a casing having an opening in one end, and studs one on each side of said opening, with a board having an opening aligning with the opening of the casing, and slots for engaging the said studs on the casing, substantially as described.

2. In a camera, the combination of the mirror for receiving the image, the reflecting-mirror, and the condensing-lens for condensing the light upon any obscure part of the photograph, for the purpose described.

3. In a camera, the combination of a casing, a board or plate for supporting the casing, and a series of boards or strips adjacent to said board for shutting out the light.

4. In a camera, the combination of the casing having an opening on each side, the inclined mirror secured in one end of the casing, the tube in the other end of the casing, the adjustable lenses in the tube, the bars pivoted in the casing, the support or standard adapted to be connected to the bars, and the single mirror adjustably connected to the support, as described.

5. In a camera, the combination of a casing having an opening on each side and a slot to hold the picture, a single mirror secured in one end of the casing at an incline, adjustable lenses in the other end of the casing, bars having one end pivoted in the casing, a support pivotally connected to one of the bars, and a single mirror adjustably connected to the support, as described.

6. In a camera, the combination of a casing having an opening on each side, strips for supporting the casing in position, a single mirror secured to one end of the casing, adjustable lenses in the other end of the casing, and an adjustable mirror carried by the casing, substantially as described.

7. A camera consisting of a rectangular casing having an opening on each side, a mirror secured in one end of the casing, adjustable lenses in the other end of the casing, a yoke or bail connected to the lens-tube for adjusting the lenses, strips or plates for supporting the casing in position and shutting out the light, and the adjustable mirror arranged outside of and connected with the casing, as described.

In testimony whereof I affix my signature in presence of two witnesses.

CHANCY R. JENNE.

Witnesses:
FRED V. GRAHAM,
D. KEMP.